(12) United States Patent
Mathew et al.

(10) Patent No.: US 11,915,117 B2
(45) Date of Patent: Feb. 27, 2024

(54) REDUCED COMPLEXITY CONVOLUTION FOR CONVOLUTIONAL NEURAL NETWORKS

(71) Applicant: TEXAS INSTRUMENTS INCORPORATED, Dallas, TX (US)

(72) Inventors: Manu Mathew, Bangalore (IN); Kumar Desappan, Bangalore (IN); Pramod Kumar Swami, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 232 days.

(21) Appl. No.: 17/327,988

(22) Filed: May 24, 2021

(65) Prior Publication Data

US 2021/0279550 A1 Sep. 9, 2021

Related U.S. Application Data

(63) Continuation of application No. 15/800,294, filed on Nov. 1, 2017, now Pat. No. 11,048,997.

(30) Foreign Application Priority Data

Dec. 27, 2016 (IN) .............................. 201641044431

(51) Int. Cl.
*G06N 3/04* (2023.01)
*G06N 3/08* (2023.01)
(Continued)

(52) U.S. Cl.
CPC ............. *G06N 3/04* (2013.01); *G06F 7/5443* (2013.01); *G06F 17/15* (2013.01); *G06F 17/153* (2013.01);
(Continued)

(58) Field of Classification Search
CPC .......... G06N 3/04; G06N 3/0454; G06N 3/06; G06N 3/063; G06N 3/08; G06N 3/084;
(Continued)

(56) References Cited

U.S. PATENT DOCUMENTS

2018/0046894 A1 2/2018 Yao
2018/0046898 A1 2/2018 Lo
(Continued)

OTHER PUBLICATIONS

Mihir Mody et al, "High Performance Front Camera ADAS Applications on TI's TDA3X Platform", 2015 IEEE 22nd International Conference on High Performance Computing (HiPC), Dec. 16-19, 2015, Bangalore, India, pp. 1-8.
(Continued)

*Primary Examiner* — Emily E Larocque
(74) *Attorney, Agent, or Firm* — Brian D. Graham; Frank D. Cimino

(57) ABSTRACT

A method for convolution in a convolutional neural network (CNN) is provided that includes accessing a coefficient value of a filter corresponding to an input feature map of a convolution layer of the CNN, and performing a block multiply accumulation operation on a block of data elements of the input feature map, the block of data elements corresponding to the coefficient value, wherein, for each data element of the block of data elements, a value of the data element is multiplied by the coefficient value and a result of the multiply is added to a corresponding data element in a corresponding output block of data elements comprised in an output feature map.

20 Claims, 11 Drawing Sheets

(51) Int. Cl.

| | |
|---|---|
| *G06N 3/082* | (2023.01) |
| *G06N 3/084* | (2023.01) |
| *G06F 17/15* | (2006.01) |
| *G06F 7/544* | (2006.01) |
| *G06N 3/045* | (2023.01) |
| *G06N 3/10* | (2006.01) |

(52) U.S. Cl.
CPC .............. *G06N 3/045* (2023.01); *G06N 3/08* (2013.01); *G06N 3/082* (2013.01); *G06N 3/084* (2013.01); *G06N 3/10* (2013.01)

(58) Field of Classification Search
CPC .......... G06N 3/082; G06N 3/088; G06N 3/10; G06N 3/105; G06F 7/5443; G06F 17/15; G06F 17/153; G06F 17/16
USPC ................. 708/315, 603, 501, 523
See application file for complete search history.

(56) References Cited

U.S. PATENT DOCUMENTS

| | | | |
|---|---|---|---|
| 2018/0046906 A1 | 2/2018 | Dally et al. | |
| 2019/0164538 A1 | 5/2019 | Seo et al. | |
| 2019/0188567 A1 | 6/2019 | Yao et al. | |
| 2020/0019794 A1* | 1/2020 | Engelcke | G06V 10/82 |

OTHER PUBLICATIONS

Max Jaderberg, et al., "Speeding up Convolutional Neural Networks with Low Rank Expansions", Proceedings of the British Machine Vision Conference 2014, BMVA Press, Nottingham, UK, Sep. 2014, pp. 1-12.

Philipp Gysel, et al., "Hardware-oriented Approximation of Convolutional Neural Networks", arXiv.org>cs>arXiv: 1604.0318v3, Cornell University Library, accepted as a workshop contribution at ICLR 2016, submitted Apr. 11, 2016, revised Oct. 20, 2016, pp. 1-8.

Murtaza Ali, et al., "Level-3 BLAS on the TI C6678 Multi-core DSP", Proceedings of the 2012 IEEE 24th International Symposium on Computer Architecture High Performance Computing, New York, NY, Oct. 24-26, 2012, pp. 179-186.

Jeff Dean, "Large-Scale Deep Learning for Intelligent Computer Systems", Embedded Vision Summit, Santa Clara, CA, May 2-4, 2016, pp. 1-69.

Marius Cordts et al., "The Cityscapes Dataset for Semantic Urban Scene Understanding", arXiv:1604.01685v2 [cs.CV], Cornell University Library, Apr. 7, 2016, pp. 1-29.

Rich Girshick et al., "Rich Feature Hierarchies for Accurate Object Detection and Semantic Segmentation", 2014 IEEE Conference on Computer Vision and Pattern Recognition, Columbus, OH, Jun. 23-28, 2014, pp. 580-587.

Kaiming He et al., "Deep Residual Learning for Image Recognition", 2016 IEEE Conference on Computer Vision and Pattern Recognition (CVPR), Jun. 27-30, 2016, Las Vegas, NV, pp. 770-778.

Mohammad Rastegari et al., "XNOR-Net: ImageNet Classification Using Binary Convolutional Neural Networks", 14th European Conference on Computer Vision, Oct. 11-14, 2016, Amsterdam, The Netherlands, first online Sep. 17, 2016, pp. 525-542.

Yangqing Jia et al., "Caffe: Convolutional Architecture for Fast Feature Embedding", Proceedings of the 22nd ACM International Conference on Multimedia, Nov. 3-7, 2014, Orlando, Florida, pp. 675-678.

Fengfu Li, et al., "Ternary Weight Networks", 30th Conference on Neural Information Processing Systems (NIPS 2016), Dec. 5-10, 2016, 2016, Barcelona, Spain, pp. 1-5.

Alex Krizhevsky, et al., "ImageNet Classification with Deep Convolutional Neural Networks", Proceedings of the 25th International Conference on Neural Information Processing Systems (NIPS 2012), Dec. 3-6, 2012, Lake Tahoe, NV, vol. 1, pp. 1097-1105.

Manu Mathew et al., "Sparse, Quantized, Full Frame CNN for Low Power Embedded Devices", 2017 IEEE Conference on Computer Vision and Pattern Recognition Workshops (CVPRW), Jul. 21-26, 2017, Honolulu, HI, pp. 11-20.

"TDA3x SoC Processors for Advanced Driver Assist Systems (ADAS) Technical Brief", Texas Instruments, Inc., SPRT704A, Oct. 2014, pp. 1-6.

"Multicore Fixed and Floating-Point Signal Processor", SPRS691E, Texas Instruments, Inc., Nov. 2010, revised Mar. 2014, pp. 1-247.

Wei Wen, et al., "Learning Structured Sparsity in Deep Neural Networks", 30th Conference on Neural Information Processing System (NIPS 2016), Barcelona, Spain, Dec. 4-9, 2016, pp. 1-9.

Karen Simonyan and Andrew Zisserman, "Very Deep Convolutional Networks for Large-Scale Image Recognition", Cornell University Library, arXiv:1409.1556v6 [cs.CV], Apr. 10, 2015, pp. 1-14.

Evan Shelhamer, et al., "Fully Convolutional Networks for Semantic Segmentation", Cornell University Library, arXiv:1605.06211v1 [cs.CV], May 20, 2016, pp. 1-12.

Marcel Simon, et al., "ImageNet Pre-trained Models with Batch Normalization", Cornell University Library, arXiv:1612.01452v2 [cs.CV], Dec. 6, 2016, pp. 1-4.

Fisher Yu and Vladen Koltun, "Multi-Scale Context Aggregation By Dilated Convolutions", Cornell University Library, arXiv:1511.07122v3, Apr. 30, 2016, pp. 1-13.

* cited by examiner

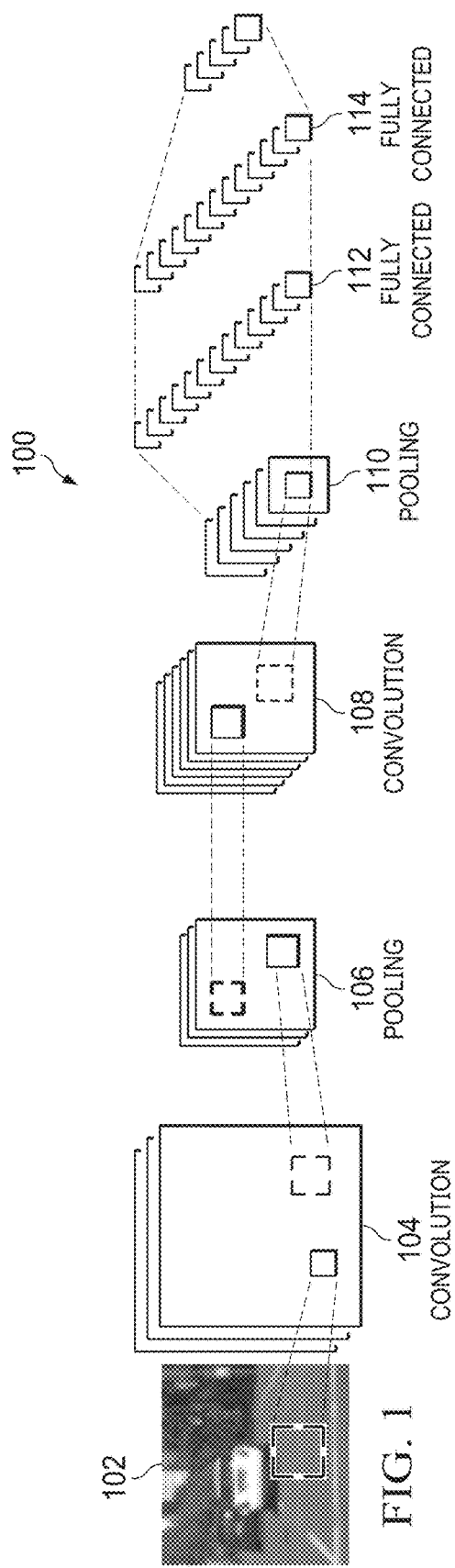
FIG. 1
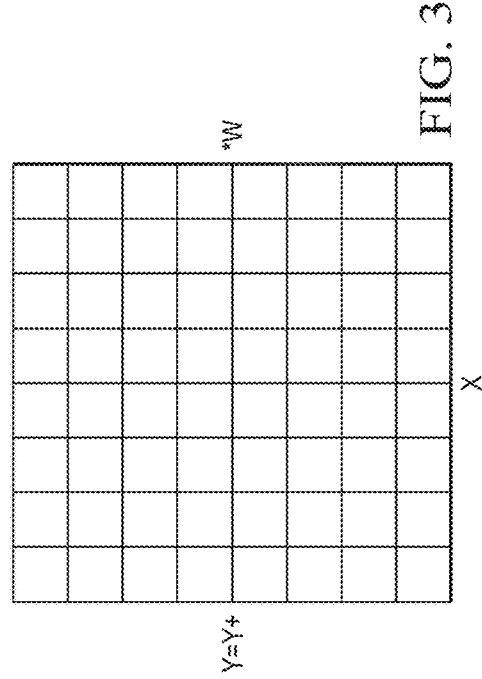
FIG. 3
FIG. 2
(PRIOR ART)

FIG. 4A

| x000 | x001 | x002 | x003 | x004 | x005 | x006 | x007 | x008 | x009 |
|---|---|---|---|---|---|---|---|---|---|
| x010 | x011 | x012 | x013 | x014 | x015 | x016 | x017 | x018 | x019 |
| x020 | x021 | x022 | x023 | x024 | x025 | x026 | x027 | x028 | x029 |
| x030 | x031 | x032 | x033 | x034 | x035 | x036 | x037 | x038 | x039 |
| x040 | x041 | x042 | x043 | x044 | x045 | x046 | x047 | x048 | x049 |
| x050 | x051 | x052 | x053 | x054 | x055 | x056 | x057 | x058 | x059 |
| x060 | x061 | x062 | x063 | x064 | x065 | x066 | x067 | x068 | x069 |
| x070 | x071 | x072 | x073 | x074 | x075 | x076 | x077 | x078 | x079 |
| x080 | x081 | x082 | x083 | x084 | x085 | x086 | x087 | x088 | x089 |
| x090 | x091 | x092 | x093 | x094 | x095 | x096 | x097 | x098 | x099 |

&X[-1][-1]

X

|   |   |   |   |   |   |   |   |   |
|---|---|---|---|---|---|---|---|---|
|   | x000 | x001 | x002 | x003 | x004 | x005 | x006 | x007 | x008 |
|   | x010 | x011 | x012 | x013 | x014 | x015 | x016 | x017 | x018 |
|   | x020 | x021 | x022 | x023 | x024 | x025 | x026 | x027 | x028 |
|   | x030 | x031 | x032 | x033 | x034 | x035 | x036 | x037 | x038 |
|   | x040 | x041 | x042 | x043 | x044 | x045 | x046 | x047 | x048 |
|   | x050 | x051 | x052 | x053 | x054 | x055 | x056 | x057 | x058 |
|   | x060 | x061 | x062 | x063 | x064 | x065 | x066 | x067 | x068 |
|   | x070 | x071 | x072 | x073 | x074 | x075 | x076 | x077 | x078 |
|   | x080 | x081 | x082 | x083 | x084 | x085 | x086 | x087 | x088 |

REDUCED COMPLEXITY CONVOLUTION FOR CONVOLUTIONAL NEURAL NETWORKS

CROSS-REFERENCE TO RELATED APPLICATIONS

This application is a continuation of U.S. patent application Ser. No. 15/800,294 filed Nov. 1, 2017, which claims benefit of India Provisional Patent Application No. 201641044431 filed Dec. 27, 2016, both of which are incorporated herein by reference in its entirety.

BACKGROUND OF THE DISCLOSURE

Field of the Disclosure

Embodiments of the present disclosure generally relate to convolutional neural networks (CNN), and more specifically relate to reducing the complexity of convolutions in CNNs.

Description of the Related Art

Convolutional neural networks (CNN) have become popular due to the capacity of such networks to learn and generalize. CNNs have been shown to perform well in techniques such as object detection, semantic segmentation, and optical flow estimation, which are increasingly being used in image recognition applications in data centers, vehicles, mobile phones, medical equipment, etc. Such applications may require CNNs to operate on a huge number of pixels per second and may also be sensitive to power consumption. Some applications may require processing of high resolution video streams of 1 Mega pixel or higher, such as, for example, object detection in Advanced Driver Assistance Systems (ADAS), where the range (distance) at which an object can be detected is directly related to the resolution. Many ADAS systems that process images near to the camera (as opposed to a central location) require power consumption to be in single digits. The computational complexity of full frame CNN applications may be out of reach for typical low power embedded devices such as digital signal processors (DSP), which are typically constrained to power consumption in single digit watts.

SUMMARY

Embodiments of the present disclosure relate to reducing the complexity of convolutions in convolutional neural networks (CNNs). In one aspect, a method for convolution in a convolutional neural network (CNN) is provided that includes accessing a coefficient value of a filter corresponding to an input feature map of a convolution layer of the CNN, and performing a block multiply accumulation operation on a block of data elements of the input feature map, the block of data elements corresponding to the coefficient value, wherein, for each data element of the block of data elements, a value of the data element is multiplied by the coefficient value and a result of the multiply is added to a corresponding data element in a corresponding output block of data elements comprised in an output feature map.

In one aspect, an apparatus is provided that includes a processor, and a memory storing software instructions that, when executed by the processor, cause convolution of an input feature map of a convolution layer of a convolutional neural network (CNN) to be performed wherein a coefficient value of a filter corresponding to the input feature map is accessed, and a block multiply accumulation operation is performed on a block of data elements of the input feature map, the block of data elements corresponding to the coefficient value, wherein, for each data element of the block of data elements, a value of the data element is multiplied by the coefficient value and a result of the multiply is added to a corresponding data element in a corresponding output block of data elements comprised in an output feature map.

In one aspect, a method for convolution of an input feature map of a convolution layer in a convolutional neural network (CNN) that includes accessing a nonzero coefficient value of a filter corresponding to the input feature map from a first plurality of nonzero coefficients of the filter, accessing a pointer to a block of data elements of the input feature map corresponding to the nonzero coefficient value from a second plurality of pointers to blocks of the feature map corresponding to the nonzero coefficient values of the first plurality, accessing a pointer to an output block of data elements of an output feature map corresponding to the block of data elements from a third plurality of pointers to output blocks of the output feature map corresponding to blocks of data elements in the second plurality, and performing a block multiply accumulation operation on the block of data elements wherein, for each data element of the block of data elements, a value of the data element is multiplied by the nonzero coefficient value and a result of the multiply is added to a corresponding data element in the output block of data elements.

In one aspect, a computer readable medium is provided that stores software instructions that, when executed by one or more processors, cause execution of convolution in a convolutional neural network (CNN), the software instructions including instructions to access a coefficient value of a filter corresponding to a feature map in a convolution layer of the CNN, and perform a block multiply accumulation operation on a block of data elements of the feature map, the block of data elements corresponding to the coefficient value, wherein, for each data element of the block of data elements, a value of the data element is multiplied by the coefficient value and a result of the multiply is added to a corresponding data element in a corresponding output block of data elements comprised in an output feature map.

BRIEF DESCRIPTION OF THE DRAWINGS

Particular embodiments will now be described, by way of example only, and with reference to the accompanying drawings:

FIG. 1 is an example of a simple convolutional neural network (CNN);

FIG. 2 is a simplified example illustrating training of a CNN;

FIG. 3 is an example illustrating a block multiply accumulation operation;

FIGS. 4A and 4B are examples illustrating zero padding;

FIG. 9 is an example illustrating sparse convolution using a BMA operation;

DETAILED DESCRIPTION OF EMBODIMENTS OF THE DISCLOSURE

Figure 5:
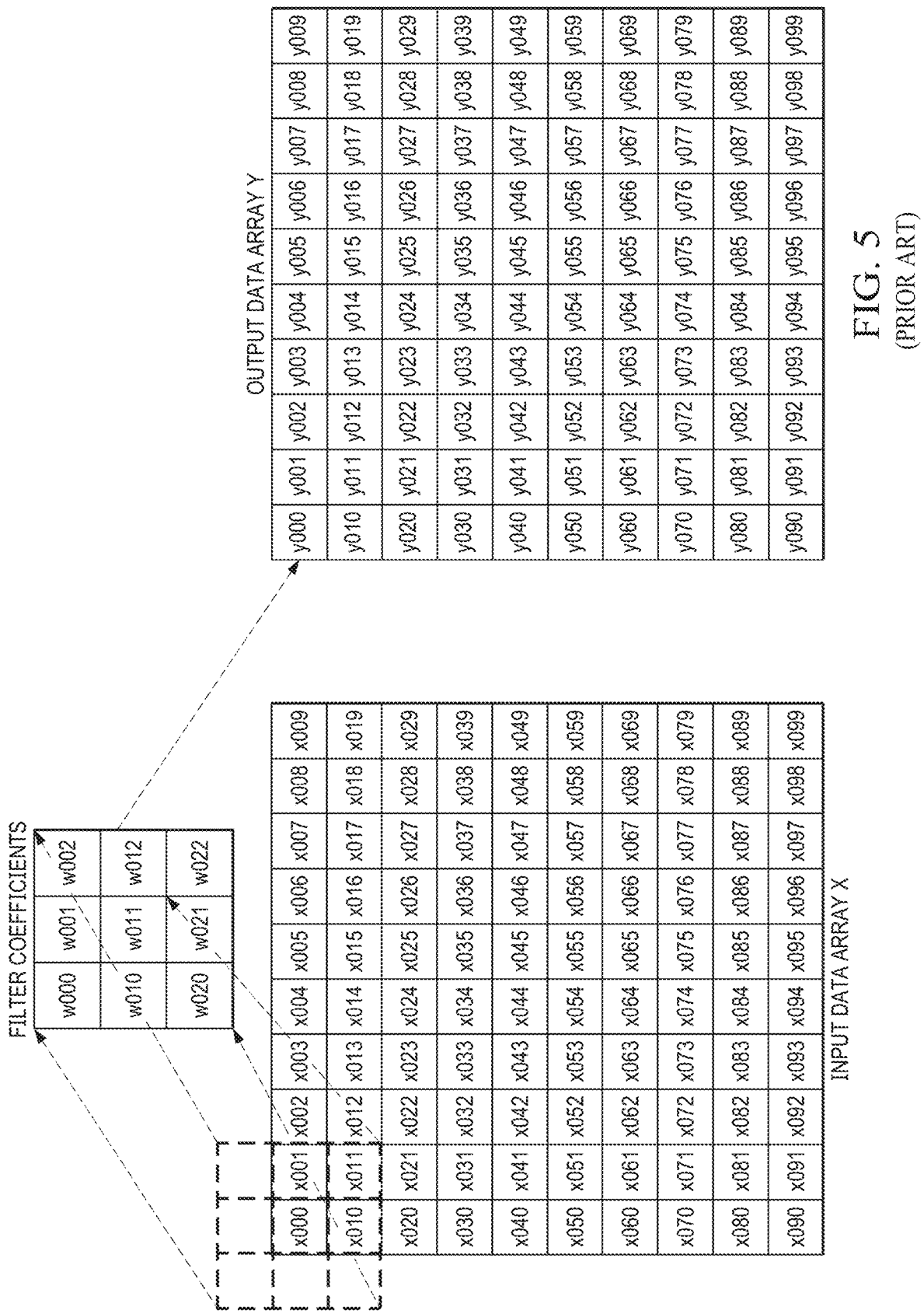
FIGS. 5-7 are examples illustrating prior art convolution.

Specific embodiments of the disclosure will now be described in detail with reference to the accompanying figures. Like elements in the various figures are denoted by like reference numerals for consistency.

A typical convolutional neural network (CNN) for image classification includes some number of convolutional and subsampling layers to extract image features followed by one or more fully connected layers as used in traditional neural networks to perform classification based on the extracted features. The input to the initial convolution layer is typically a m×n×r image where m is the height of the image, n is the width of the image, and r is the number of channels, e.g., for an RGB image, r=3. The output of each convolution layer and each subsampling layer is a set of feature maps which are the input to the next layer in the CNN.

Each convolution layer includes some number of filters, the size and number of which may be different for each layer. Further, the filters may differ across the input feature maps. The coefficients or weights of the filters are determined by training the CNN with a set of training images. The trained filters act as feature detectors from the original input image. In the initial convolution layer, each filter of the layer is convolved with the image to produce a feature map corresponding to each filter. In subsequent convolution layers, filters are convolved with corresponding feature maps to produce a feature map corresponding to each filter.

Convolution may be performed as follows. Initially, the filter is logically centered on the top left location of the feature map or image. An element wise multiplication is then performed between the filter and the elements in the patch covered by the filter and the results of the multiplications are added. The result of the addition is the value of the top left location in the output feature map. The filter is then moved by one or more locations to the right, i.e., by a stride, and the computation is repeated to determine the next value of the output feature map. The stride amount may vary for each filter. Once a row is processed, the filter is moved down one or more locations to another row as specified by the stride and the computations are performed across the row. The computation ends when all rows of the input selected as per the stride are processed. Note that for some locations of the filter in the input filter map or image, element values are not available, e.g., for locations at the boundaries of the input filter map or image. In such cases, zero padding may be used. Further, the convolution output of multiple input feature maps corresponding to channels may be added together to form one output feature map.

The feature maps resulting from a convolution layer may be processed by applying a non-linear operation, i.e., an activation function, to make the CNN more effective. A non-linear activation function makes a CNN much more accurate in image recognition tasks because the problem that is solved by the CNN may be complex and non-linear while convolution is linear. One common activation function used is the rectified linear unit (ReLU) which is applied per element in a feature map and replaces all negative values with zero. This specific type of activation function may be referred to as rectification.

Each subsampling layer, which may also be referred to as a pooling layer, reduces the dimensionality of each feature map while retaining the most important information. The subsampling can be of different types, e.g., max pooling, average pooling, or striding.

FIG. 1 is an example of the process flow of a simple convolutional neural network (CNN) 100 that classifies an input image into one of four classes. More specifically, the CNN 100 includes two convolution layers outputting feature maps 104, 108. Each convolution layer is followed by a respective subsampling layer outputting feature maps 106, 110. The last pooling layer is followed by two fully connected layers outputting feature maps 112, 114 that classify the image 102 based on the features extracted by the convolution and pooling layers. In the example of FIG. 1, two sets of alternating convolution and pooling layers are shown.

In practice, a CNN may have many of each type of layer. Further, more than one convolution layer may be performed before a pooling layer. For example, the first convolution layer of a CNN typically may output thirty-two or sixty-four feature maps. The next convolution layer may generate thirty-two, sixty-four, or one hundred and twenty-eight feature maps. A typical CNN may have five, ten, or even fifty convolution layers. To understand the complexity of a CNN, consider a convolution layer with sixty-four input 320×160 feature maps that generates one hundred and twenty-eight feature maps. Further, assume the one hundred and twenty-eight filters applied by the convolution layer to generate the output feature maps are 3×3. The number of multiply accumulations (MACs) required for each position in one output feature map is 64×3×3 and the total MACs required for the convolution layer is 320×160×64×3×3×128.

As previously mentioned, the coefficients or weights of the filters are determined by training the CNN with a set of training images. FIG. 2 is a simplified example illustrating training of a CNN using a commonly used training technique referred to as stochastic gradient descent back propagation. In this example, the number of filters and the sizes of the filters, the numbers and types of layers, and other parameters are determined prior to the training process and do not change during training. Only the filter coefficients are updated. The training is explained using the CNN 100 of FIG. 1 as an example.

The training process may be summarized as follows. The filter coefficients of all filters are initialized with random values. The CNN 100 takes a training image of a set of training images as input and performs the forward propagation 200. That is, the training image is processed thought the convolution, pooling, and fully connected layers and outputs a probability for each class. The total error of the probabilities is determined as per $$\text{Total Error} = \tfrac{1}{2}\Sigma(\text{target probability} - \text{output probability})^2$$

where the summation is over all output classes, e.g., the four classes of the CNN of FIG. 1, and the target probability for the class represented by the image is 1 and the other target probabilities are 0.

Back propagation 202 is then performed to calculate the gradients of the total error with respect to all the filter coefficients. Gradient descent is used to update 204 all the filter coefficients to minimize the total error. The coefficients are adjusted in proportion to their contribution to the total error. The training process is then repeated with the same training image. The training process may be repeated with the same training image until the output probabilities are sufficiently close to the target probabilities. The training process is repeated for each training image in the training set.

Embodiments of the disclosure provide for reduction in the complexity of convolutional neural networks (CNN) that may allow execution of CNNs on low power embedded devices. In some embodiments, sparse convolution based on a block multiply accumulation (BMA) operation is performed that eliminates multiplication operations when coefficients have a value of zero. In some embodiments, a training approach for a CNN is provided that includes sparsification of the CNN to force more filter coefficients to have a value of zero.

Additional description of concepts in this disclosure may be found in M. Mathew, et al., "Sparse, Quantized, Full Frame CNN for Low Power Embedded Devices," The IEEE Conference on Computer Vision and Pattern Recognition (CVPR) Embedded Vision Workshop, Honolulu, Hi., Jul. 21, 2017, pp. 11-19, which is incorporated by reference herein in its entirety.

In the convolution layers of a CNN, many filter coefficients are zero or near zero. For example, almost 50% of the coefficients can be zeros in typical CNNs. Further, sparsity inducing training approaches may be used to further increase the sparsity of a CNN, i.e., to force more coefficients to be zero, without significantly affecting the accuracy of the CNN. Embodiments provide a block multiply accumulation (BMA) operation to perform the convolutions. In some embodiments, the BMA operation eliminates the multiplications by zero-value coefficients and thus reduces the number of MACs. In general, the BMA operation converts the convolution operations to block operations using single filter coefficients. Performing the convolutions as block operations allows entire block operations to be skipped if the coefficient value is zero.

Consider the function Y+=X*w which multiplies each element of a block of data X by a coefficient value w and accumulates the result to corresponding locations in an output block of data Y. FIG. 3 illustrates this operation pictorially. Table 1 is example pseudo code of this function. Note that this pseudo code and other pseudo codes examples herein are based on the C programming language. In the pseudo code function blockMultiply, X is a two dimensional (2D) input block or array and Y is a 2D output block or array, W and H are the width and height of the arrays, and w is a coefficient value from a filter. This operation is the core kernel of BMA.

TABLE 1

```
void blockMultiply(float X[H][W], float w, float Y[H][W]) {
    for(int i=0; i<H; i++) {
        for(int j=0; j<W; j++) {
            Y[i][j] += (X[i][j] * w)}}}
```

The above operation can be used to realize a convolution layer where X is a block of features from an input feature map (or other input data/image) and Y is corresponding block in the output feature map. This concept is illustrated using a 3×3 filter as an example. In other embodiments, other filter sizes may be used. Table 2 is example pseudo code illustrating convolutions using a 3×3 filter. This operation can be rewritten using BMA as shown in the example pseudo code of Table 3. In these tables and others herein, weights is a 3×3 array of filter coefficients.

TABLE 2

```
for(int i=0; i<W;i++) {
    for(int j=0; j<H; j++) {
        for(int r=-1;r<=1;r++) {
            for(int s=-1;s<=1;s++){
                Y[i][j] += X[(i+r)][j+s)] * weights [1+r][1+s]}}}}
```

TABLE 3

```
for(int r=-1;r<=1;r++) {
    for(int s=-1;s<=1;x++){
        w = weights[1+r][1+s]
        for(int i=0; i<W;i++) {
            for(int j=0; j<H; j++) {
                Y[i][j] += X[(i+r)][j+s)] * w}}}}
```

The 3×3 filter can be applied using a kernel based on blockMultiply as shown in the example pseudo code of Table 4 where xPtr is a pointer to a 2D block of data X. To accommodate application of the 3×3 filter to boundary locations in the block X, zero padding may be used. In this example pseudo code, X is a pointer to the top left location of the actual data and the indices r and s are used to provide pointers for the placement of the filter in the zero padded array. Consider the example of FIG. 4A and FIG. 4B. FIG. 4A shows the actual block of data and FIG. 4B shows the zero padded block. The location of the pointer X in the zero padded block and the location of xPtr for r=−1, s=−1 are shown.

TABLE 4

```
for(int r=-1;r<=1;r++) {
    for(int s=-1;s<=1;s++){
        xPtr = &X[r][s]
        w = weights[1+r][1+s]
        blockMultiply (xPtr, w, Y) }}
```

The complexity of performing the convolutions using blockMultiply may be reduced by not performing the multiplication when the value of the coefficient is zero. This is illustrated in the example pseudo code of Table 5. Note that the block multiply is performed only if the coefficient value is not zero.

TABLE 5

```
for(int r=-1;r<=1;r++) {
    for(int s=-1;s<=1;s++) {
        xPtr = &X[r][s]
        w = weights[1+r][1+s]
        if(w!= 0) {
            blockMultiply(xPtr, w, Y) }}}
```

Figure 6:
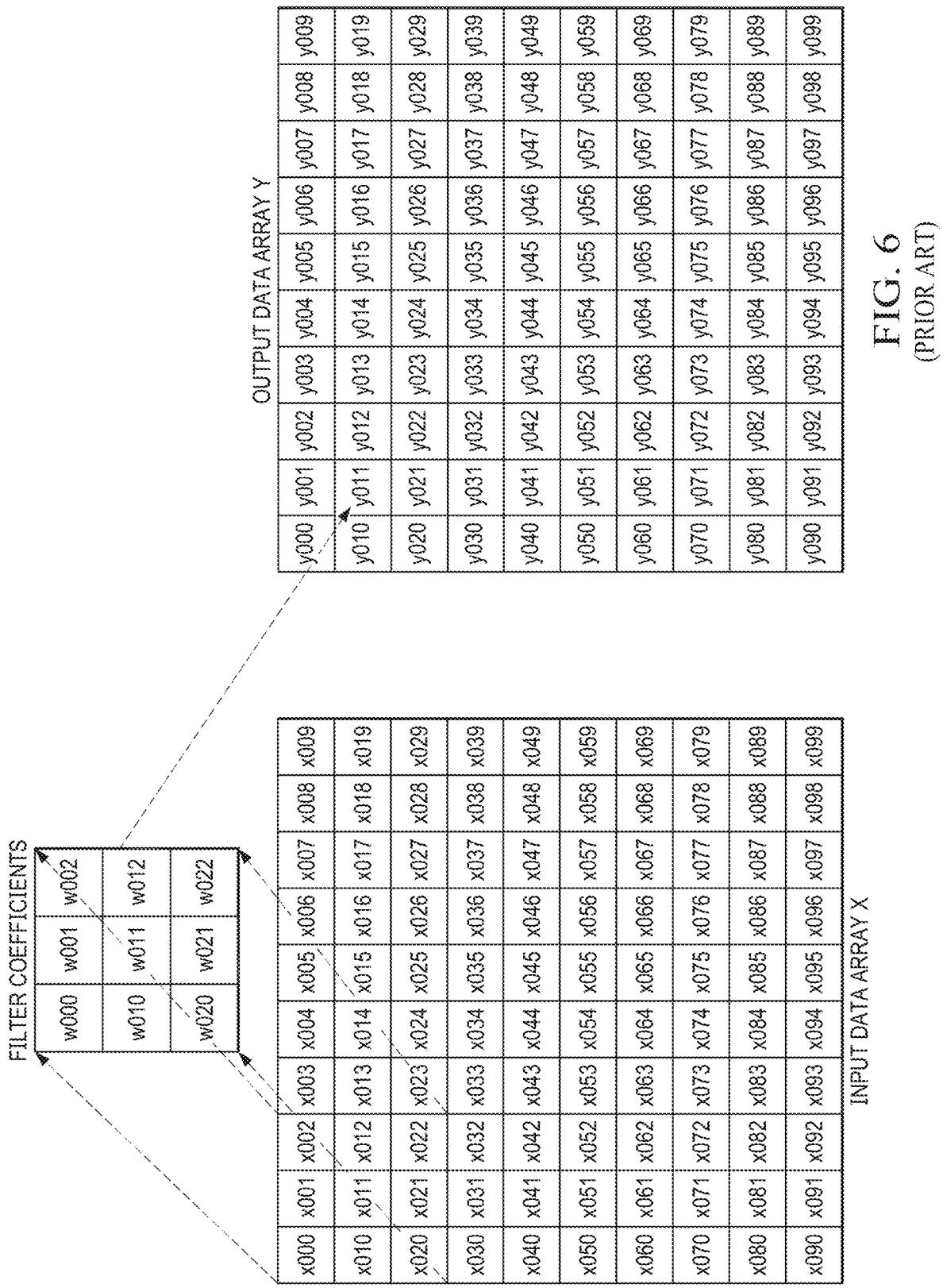
Figure 7:
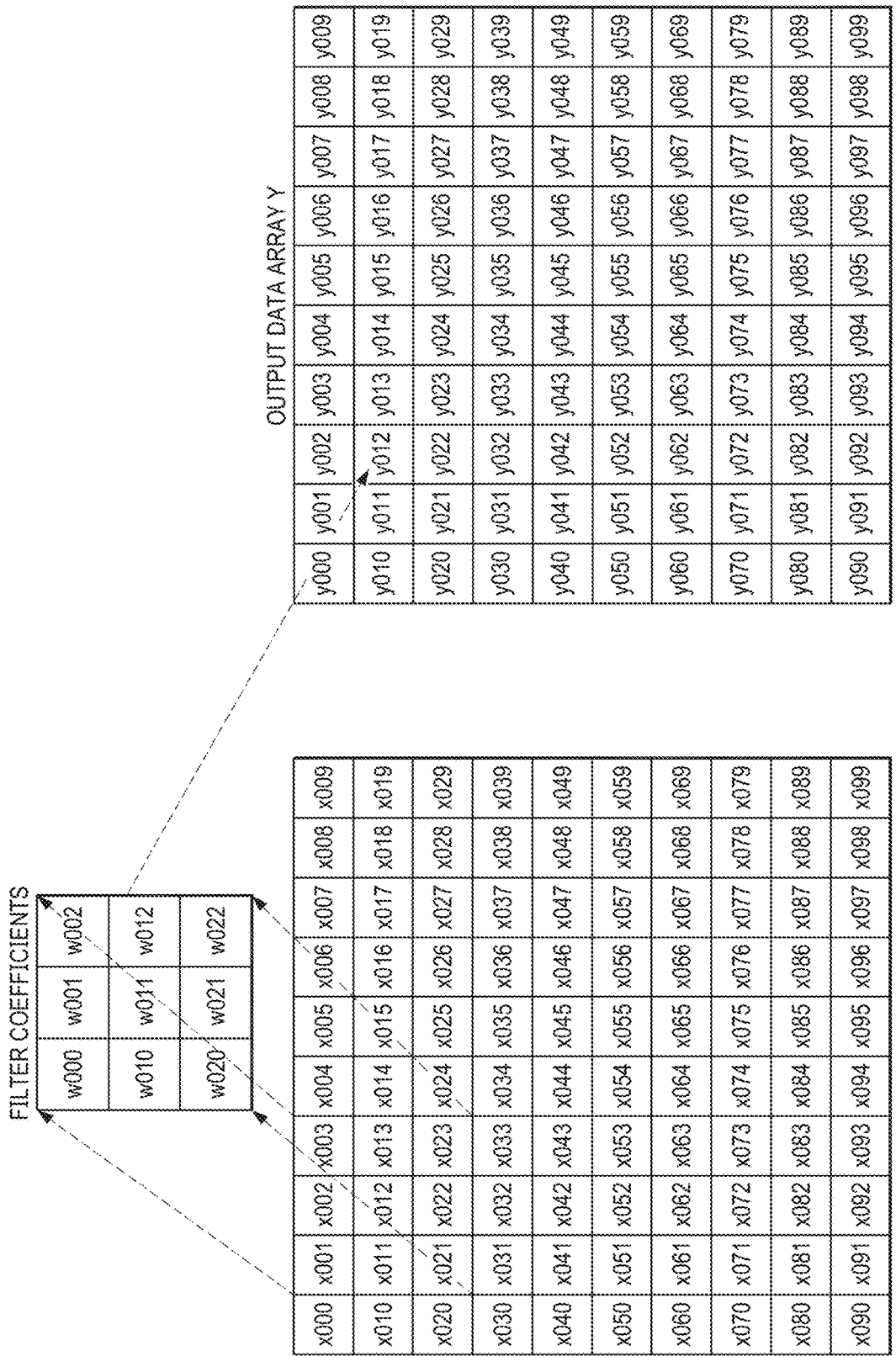

FIGS. 5-9 are examples illustrating convolution without BMA, convolution with BMA, and sparse convolution using BMA. FIG. 5, FIG. 6, and FIG. 7 illustrate convolution without BMA using a 3×3 filter. Specifically, FIG. 5 illustrates application of the filter centered at location x000 in the input data array X to compute the value of location y000 in the output data block Y, i.e., y000=0*w0000+0*w0001+ 0*w0002+0*w0010+x000*w0011+x011*w0012+ 0*w0020+x020*w0021+x021*w0022. Note that zero fill is used for locations outside the input data block X. FIG. 6 illustrates application of the filter centered at location x011 in the input data block X to compute the value of location y011 in the output data block Y, i.e., y011=x000*w0000+x001*w0001+x002*w0002+x010*w0010+x011*w0011+x012*w0012+x020*w0020+x021*w0021+x022*w0022.

FIG. 7 illustrates application of the filter centered at location x012 in the input data block X to compute the value of location y012 in the output data block Y, i.e., y012=x001*w0000+x002*w0001+x003*w0002+x011*w0010+x012*w0011+x013*w0012+x021*w0020+x022*w0021+x023*w0022.

Figure 8:
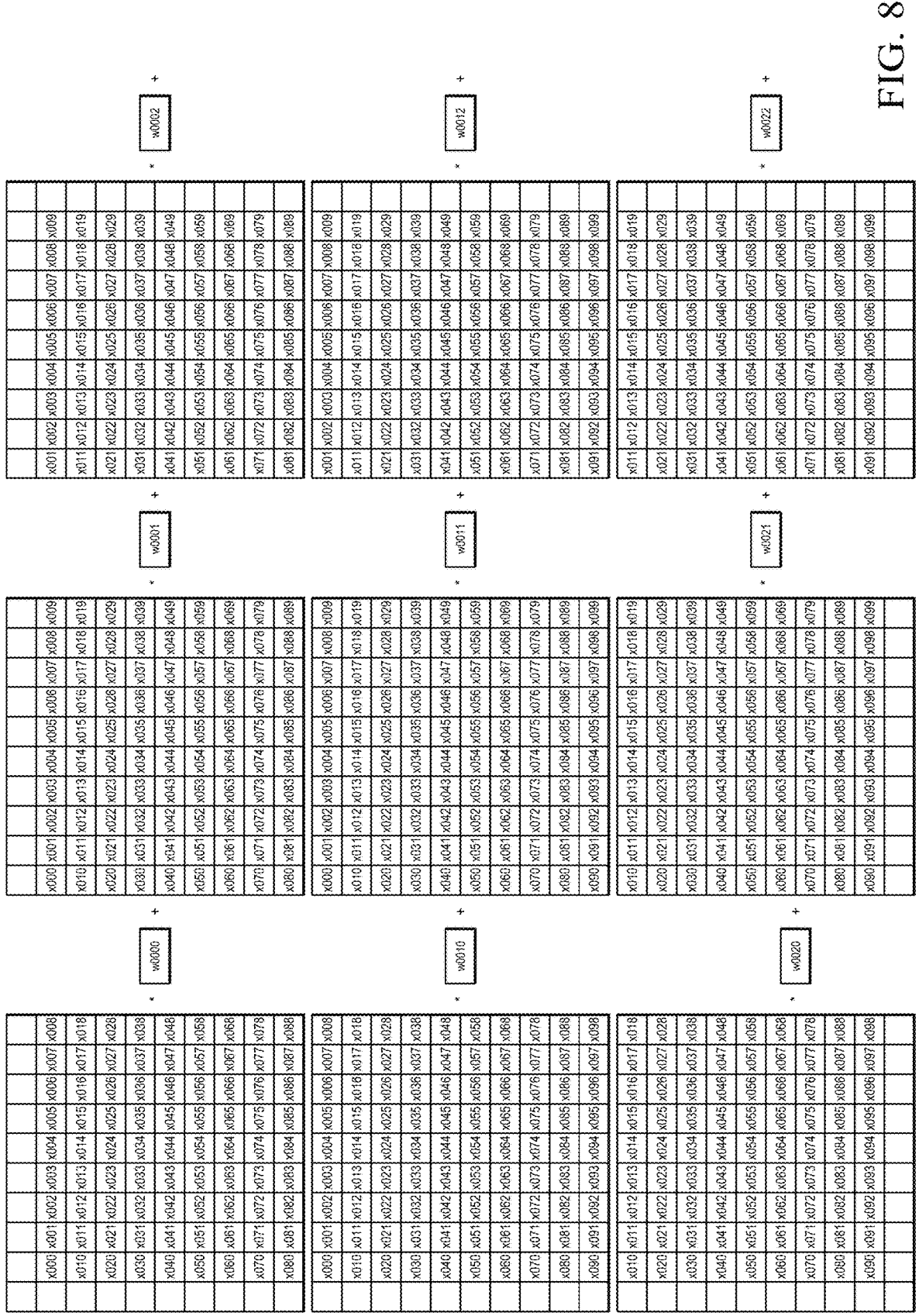
FIG. 8 is an example illustrating convolution using a block multiply accumulation (BMA) operation.
Figure 9:
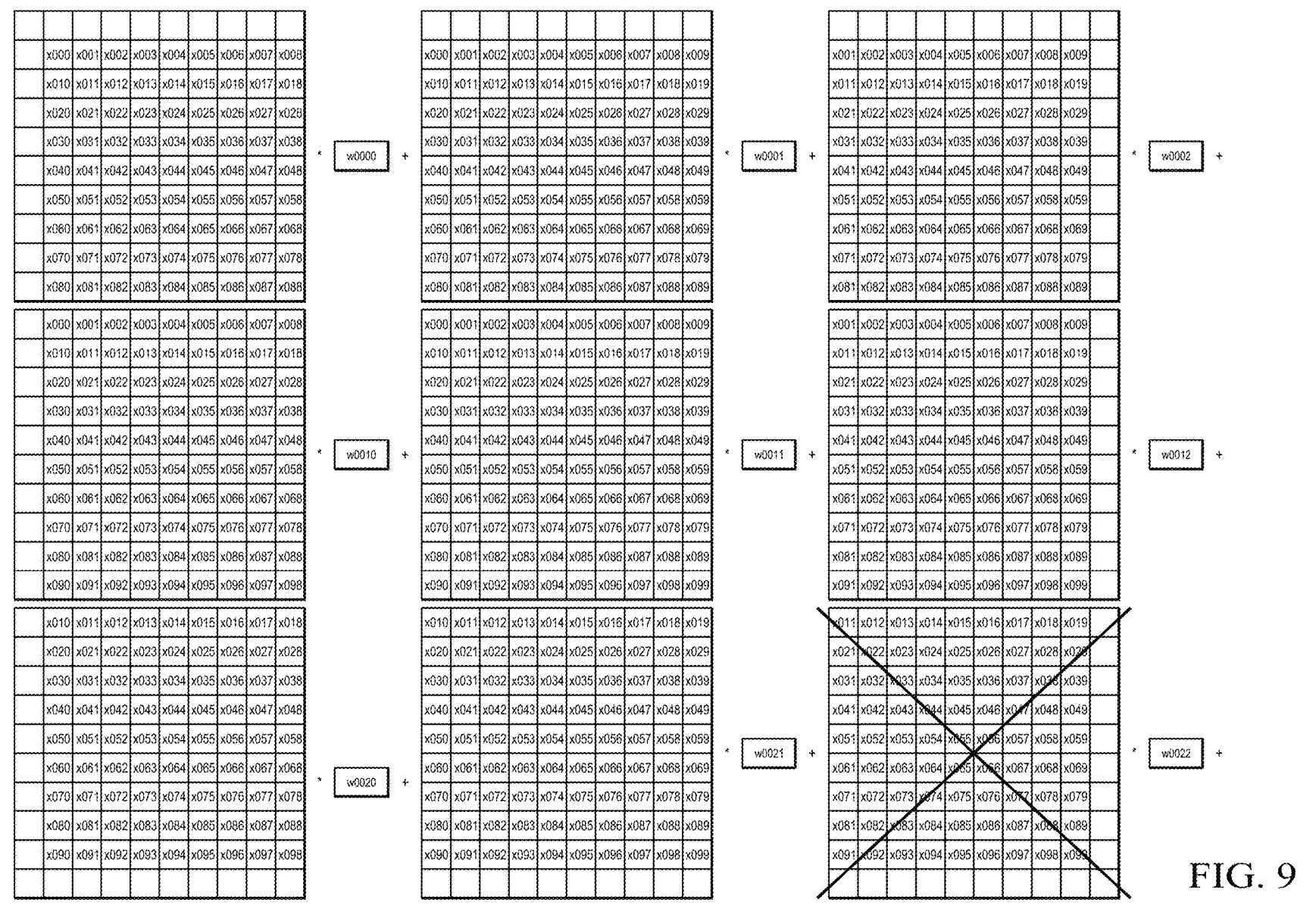

FIG. 8 illustrates convolution based on BMA, in which the entire input data block X is multiplied by each filter coefficient separately. FIG. 9 illustrates sparse convolution using BMA. In this example, w0022 is assumed to be zero, thus allowing the block multiplication with that coefficient to be skipped.

In CNN convolution layers, typically several input channels or feature maps contribute to one output channel or feature map, e.g., for an RGB image, the feature maps corresponding to the R, G, and B channels may be convolved to form one output feature map. Further, while filtering a single feature map, several offset positions may need to be multiplied by the same coefficient. Both of these can be thought of as block multiply operations on blocks of data with the corresponding coefficient. An entire convolution layer based on BMA may be implemented as follows.

An analysis step may be performed to collect the block pointers corresponding to blocks that will be multiplied by nonzero coefficients. This analysis step may be referred to as block analysis herein. The nonzero coefficients and the corresponding input and output block pointers may be collected in separate lists or other suitable data structures. Table 6 is example pseudo code illustrating this analysis for a 3×3 filter. In this pseudo code, X is a three dimensional (3D) array, with the third dimension being the number of input channels. Similarly, Y is a 3D array, with the third dimension being the number of output channels. Weights is a four dimensional array indexed by the output channel, the input channel, and the filter height and width. Further, xList and yList are arrays of pointers to the 2D input blocks and corresponding output blocks and wList is an array of nonzero coefficients corresponding to the pointers in xList.

TABLE 6

```
n=0
for(no=0;no<No;no++) { //output channels
    for(ni=0;ni<Ni;ni++) { //input channels
        for(int r=-1;r<=1;r++) {
            for(int s=-1;s<=1;s++){
                if(weights[no][ni][r][s] != 0) {
                    xList[n] = &X[ni][r][s]
                    wList[n] = &weights[no][ni][r][s]
                    yList[n] = &Y[no][r][s]
                    n++ }}}}}
```

The lists may then be passed to a BMA kernel that performs the entire convolution layer. In general, the kernel takes a block pointer from xList, a coefficient from wList corresponding to the block pointed to by the xList block pointer, a block pointer from yList corresponding to the xList block pointer, multiplies the block pointed to by the xList block pointer by the coefficient, and accumulates the results in the block pointed to by the yList block pointer. Table 7 is example pseudo code of the list based BMA operation.

TABLE 7

```
void blockMultiplyList(float xList[N], float wList[N], float yList[N]) {
    for(int n=0; n<N; n++) {
        blockMultiply(xList[n], wList[n], yList[n]) }}
```

The pseudo code of Table 7 is a simplified view of list based BMA that requires the input block and the output block to be brought into a processor, weighted and accumulated. However, in practice, the input block that is brought in can be used for creating multiple output blocks as one input feature map may contribute to multiple output feature maps in a CNN. This can be accomplished by processing multiple output blocks that result from the same input blocks together.

Figure 10:
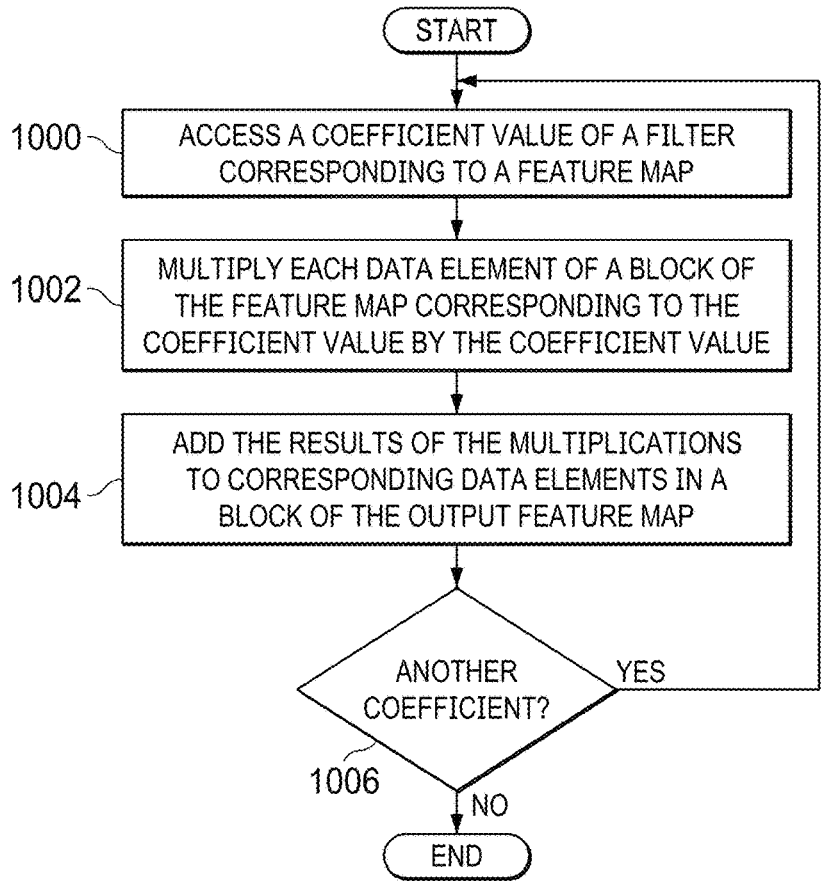
FIG. 10 is a flow diagram of a method for convolution using a BMA operation.

FIG. 10 is a flow diagram of a method for convolution of a feature map with a filter using block multiply accumulation. Initially, a coefficient value of the filter is accessed 1000. Each data element of a block of the feature map corresponding to the coefficient value is then multiplied 1002 by the coefficient value and the results of the multiplications are added 1004 to corresponding data elements in a block of the output feature map. The access 1000, multiply 1002, and addition 1004 are repeated 1006 for each of the other coefficient values in the filter.

A block of a feature map corresponds to a coefficient value when all of the data elements in the block would be multiplied by the coefficient value as the filter is applied across the feature map using the prior art convolution. The example of FIG. 8 shows the blocks of the example feature map, i.e., input data array X, of FIG. 5 corresponding to the filter coefficients of the 3×3 filter of FIG. 5 assuming that zero padding is used. In this example, each of the corresponding blocks is the same size as the feature map.

In some embodiments of the method of FIG. 10, the multiply and add steps are performed only when the coefficient value is nonzero. In some such embodiments, the value of the coefficient is checked and the steps are skipped if the value is zero. In other embodiments, the input to the method may be the result of the previously described block analysis in which zero coefficients and blocks corresponding to zero coefficients are not included in the analysis output.

To further reduce the complexity of a CNN and thus reduce the MACs required for execution, as many coefficients as possible may be forced to zero without significant loss of accuracy. In general, the process of forcing coefficients to zero is referred to as sparsification of a CNN. In some embodiments, sparsification is performed as part of training a CNN.

Figure 11:
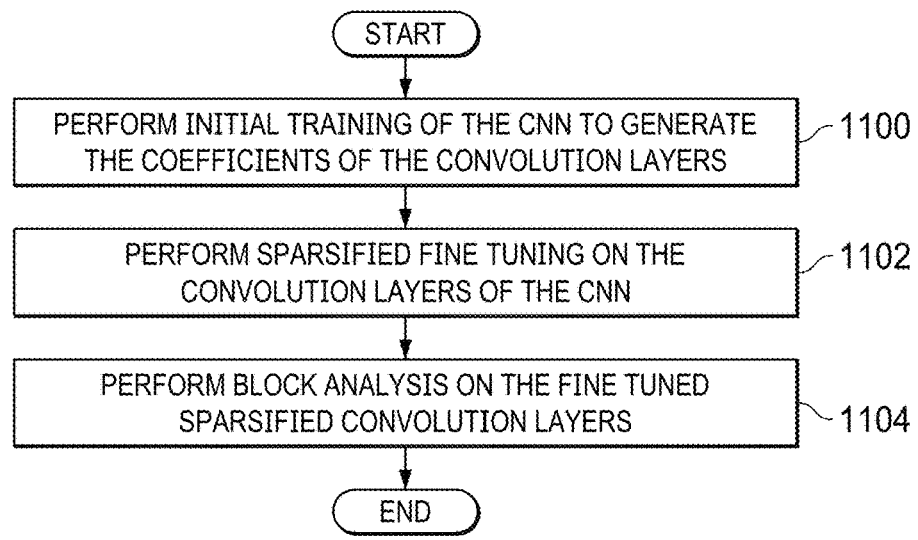
FIG. 11 is a flow diagram of a method for generating a sparsified CNN.

FIG. 11 is a flow diagram of a method for generating a sparsified CNN. Initially, the CNN is trained 1100 using a suitable training technique to generate the coefficients of the convolution layers. In some embodiments, the training technique is the stochastic gradient descent back propagation previously described herein. Further, in some embodiments, L1 regularized training with a relatively high weight decay is used to induce sparsity in the coefficients. For example, a version of Caffe deep learning framework may be used to perform such training. Caffe is an open source customizable framework for training and deploying convolution neural networks that implements the stochastic gradient descent back propagation training algorithm. An overview of Caffe may be found, for example, in Y. Jia, et al., "Caffe Convolutional Architecture for Fast Feature Embedding", Proceedings of the $22^{nd}$ ACM International Conference on Multimedia, Orlando, Fla., Nov. 3-7, 2014, pp. 645-678.

Once the initial training is performed, sparsified fine tuning is performed 1102 on the convolution layers of the CNN. In general, fine tuning operates much the same as the initial training except that the fine tuning begins with the coefficients from the initial training. The same training set is used as input and the coefficients are adjusted. However, the speed of change of the coefficient values is slower than what is allowed in the initial training. The speed of adjustment of coefficient values is controlled by the "learning rate" which is a multiplication factor with a small value that is applied to the gradients during back propagation. This fine tuning is modified to include a sparsification technique. The sparsified fine tuning is explained in more detail in reference to FIGS. 12-14.

After the sparsified fine tuning, block analysis may be performed 1104 on the tuned sparsified CNN to collect block pointers corresponding to blocks that will be multiplied by nonzero coefficients during convolution. Block analysis is previously described herein.

Figure 12:
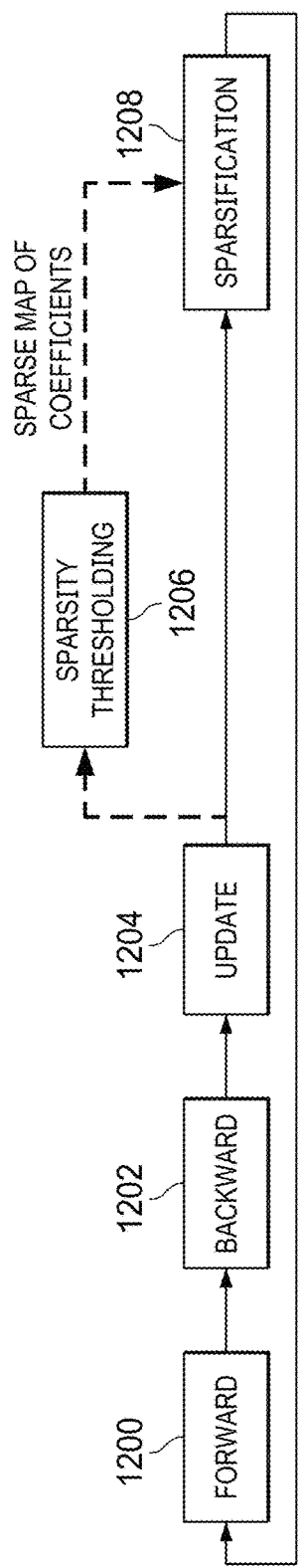
FIG. 12 is a diagram of a stochastic gradient descent back propagation tuning method modified to include sparsification.

FIG. 12 is a diagram of a stochastic gradient descent back propagation fine tuning method modified to include sparsification. In general, the sparsification technique used attempts to meet a specified sparsity target by setting selected filter coefficients to zero after each tuning iteration. The filter coefficients to be set to zero are selected based on a dynamic threshold determined for each layer based on the sparsity target.

The forward propagation 1200, backward propagation 1202, and update 1204 implement the stochastic gradient descent back propagation algorithm. These steps operate as previously described herein in references to blocks of the same name in FIG. 2.

Sparsity thresholding 1206 and sparsification 1208 implement the sparsification of the convolution layers of the CNN as the CNN is tuned. Sparsity thresholding 1206 operates to determine which coefficients in each convolution layer can be set to zero using a threshold determined for each layer based on a sparsity target for the layer. The result of the sparsity thresholding 1206 is a "sparse coefficient map" for each convolution layer that identifies which coefficients can be set to zero and which should be allowed to change in subsequent fine tuning iterations. Methods for sparsity thresholding are described below in reference to FIG. 13 and FIG. 14.

The sparsification 1208 changes the values of the coefficients that can be forced to zero as identified by the sparsity thresholding 1206 to zero after the update 1204 of each training iteration. More specifically, the sparsification 1208 uses the sparse coefficient maps to locate the coefficients to be set to zero in the filters output by the update 1204 and changes the values of those coefficients to zero. Thus, the sparsification 1208 ensures that the values of such coefficients remain zero even if the update 1204 changes the coefficient values.

While the sparsification 1208 is executed for each tuning iteration using the current sparse coefficient map, sparsity thresholding 1206 may not be executed for each training iteration as the thresholding may be time consuming. Instead, the frequency of execution of the sparsity thresholding may be empirically determined.

Figure 13:
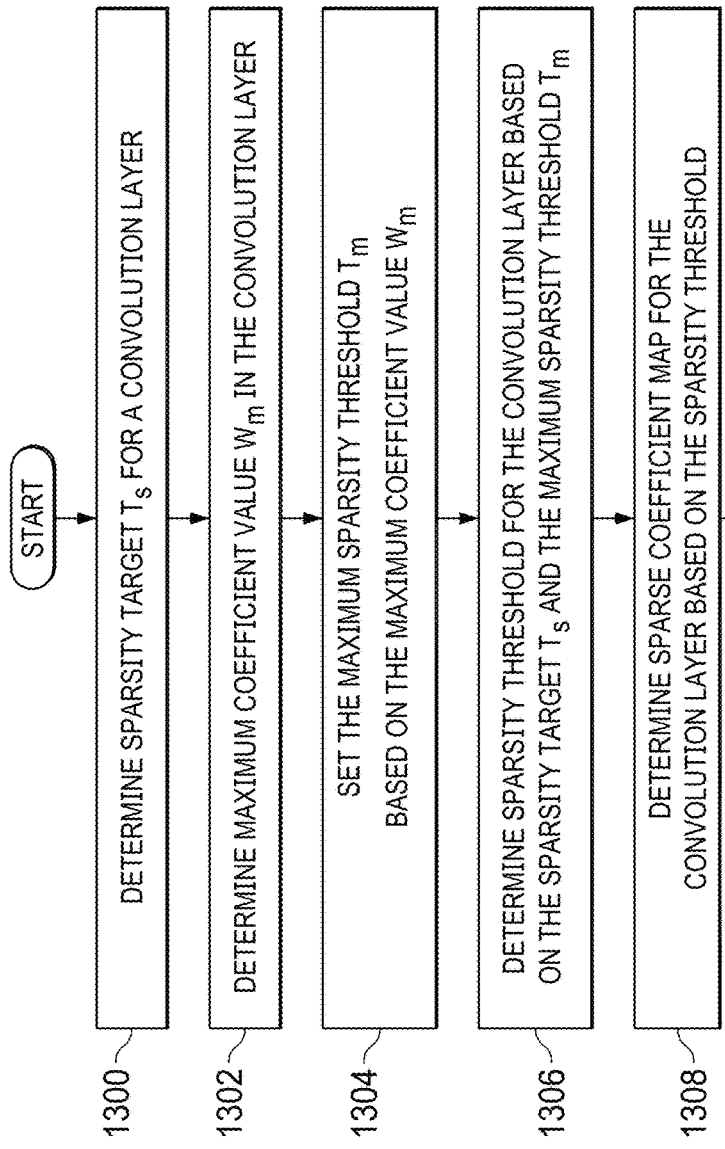
FIG. 13 is a flow diagram of a method for sparsity thresholding of a convolution layer of a CNN.

FIG. 13 is a flow diagram of a method for sparsity thresholding of a convolution layer of a CNN. This method may be repeated for each convolution layer of a CNN as part of the sparsity thresholding 1106. Initially a sparsity target $T_s$ for a convolution layer is determined 1300, where $T_s$ is the desired ratio of the number of zero coefficients to the total number of coefficients in the layer. Any suitable value may be used for the sparsity target $T_s$. The sparsity target $T_s$ may be an empirically determined value selected based on a tradeoff between speed of execution of the resulting sparsified layer and accuracy among other factors. Some examples of suitable sparsity targets are 80% and 85%.

Further, the sparsity target $T_s$ may differ among convolution layers. For example, the first and last convolution layers may have a lower sparsity target as these layers tend to have very few coefficients. More generally, for layers having a large number of coefficients, most, e.g., 80%, of the coefficient values can be made zero without significant loss of accuracy while for layers having a small number of coefficients, a smaller percentage, e.g., 40%, of the coefficient values can be made zero.

In some embodiments, the sparsity target for one or more convolution layers may change during training. For example, the sparsity target may be 10% the first time the sparsity thresholding is performed. The sparsity target may then be increased in steps of 10% each time the sparsity thresholding is performed thereafter until a final sparsity target of 80% is reached.

Referring again to FIG. 13, in addition to determining the sparsity target, the maximum coefficient value $W_m$ in the convolution layer is determined 1302. The maximum coefficient value $W_m$ is the maximum of the absolute values of coefficients in the layer. A maximum threshold value $T_m$ is then set based on the maximum coefficient value $W_m$. More specifically, the maximum threshold value is set to be a fraction a of the maximum coefficient value, i.e., $$T_m = \alpha * W_m$$

where the value of a is empirically determined. In general, a low value for the maximum threshold value, and hence a low value of $\alpha$, is important for retaining accuracy. The value of $\alpha$ may be, for example, 0.2.

A sparsity threshold for the convolution layer is then determined 1306 based on the sparsity target $T_s$ and the maximum sparsity threshold $T_m$. The sparsity threshold is the threshold to be used for determining which of the coefficients in layer are to be set to zero. A method for determining the sparsity threshold is described below in reference to FIG. 14. The sparsity threshold is then used to determine 1308 the sparse coefficient map for the convolution layer. The sparse coefficient map indicates which of the coefficients in the layer filters are to be set to zero. Any coefficient in the layer having a value that is less than or equal to the sparsity threshold is identified in the sparse coefficient map as a coefficient that is to be set to zero.

Figure 14:
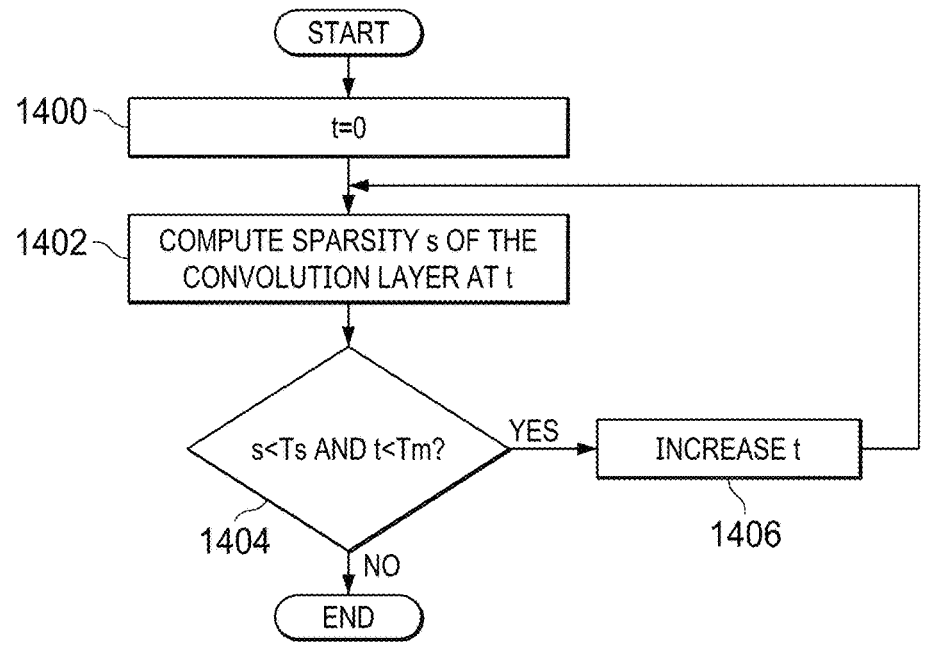
FIG. 14 is a flow diagram of a method for determining a sparsity threshold for a convolution layer.

FIG. 14 is a flow diagram of a method for determining a sparsity threshold for a convolution layer given the sparsity target $T_s$ and the maximum sparsity threshold $T_m$ for the layer. In general, the determination of the sparsity threshold begins with a small sparsity threshold t that is much smaller than the maximum sparsity threshold $T_m$ and computes the amount of sparsity s, i.e., the ratio of zero value coefficients to total number of coefficients, that can be achieved using the sparsity threshold t. If the sparsity s is less than the sparsity target $T_s$ and the sparsity threshold t is less than the maximum sparsity threshold $T_m$, the sparsity threshold t is increased by a small amount and the amount of sparsity s with the new sparse threshold value is computed. This process is repeated until the sparsity threshold t is greater than or equal to the maximum sparsity threshold $T_m$ or the sparsity target $T_s$ is reached.

Referring now to FIG. 14, initially the sparsity threshold t is initialized 1400 to zero. The sparsity s of the convolution layer is then computed 1402 with the current value of the sparsity threshold t. If the sparsity s is less than the target sparsity $T_s$ and the sparsity threshold t is less than the maximum sparsity threshold $T_m$ 1404, then the sparsity threshold is increased 1406 by a small amount, e.g., 1e-7, and again computes 1402 the sparsity s of the convolution layer with the new value of the sparsity threshold t. Steps 1402, 1404, and 1406 are repeated until either the sparsity s is greater than or equal to the sparsity target $T_s$ or the sparsity threshold t is greater than or equal to the maximum sparsity threshold $T_m$.

Table 8 is example pseudo code for determining the sparsity threshold t of a convolution layer. In this pseudo code, C is the set of coefficients of the layer and β is a small increment value, e.g., 1e-7. Further, Sparsity( ) is a function that computes the sparsity of the set of coefficients C at the current value of the sparsity threshold t, i.e., the function counts the number of coefficients in the set of coefficients C having an absolute value less than the current sparsity threshold t.

TABLE 8

```
t = 0;
s = Sparsity(C,t);
while s < Ts and t < Tm;
   t =t+ β
   s = Sparsity(C,t);
```

The sparsity threshold t resulting from the method of FIG. 14 is not guaranteed to meet the sparsity target $T_s$. In some embodiments, a sparsity target may be set for the entire CNN. In such embodiments, the proximity of the thresholding results to sparsity targets for the individual convolution layers may be monitored and the sparsity targets for the layers adjusted as needed to achieve the CNN sparsity target. In other words, given a CNN sparsity target, rather than using that same sparsity target for each convolution layer, the sparsity targets for the layers may be varied with some higher than the CNN sparsity target to compensate for layers that cannot meet the CNN sparsity target. For example, let the CNN sparsity target be 80%. If the sparsification of one convolution layer is only 70%, then the sparsity target for another convolution layer may be set to 90% in an attempt to compensate for the underperforming layer.

Figure 15:
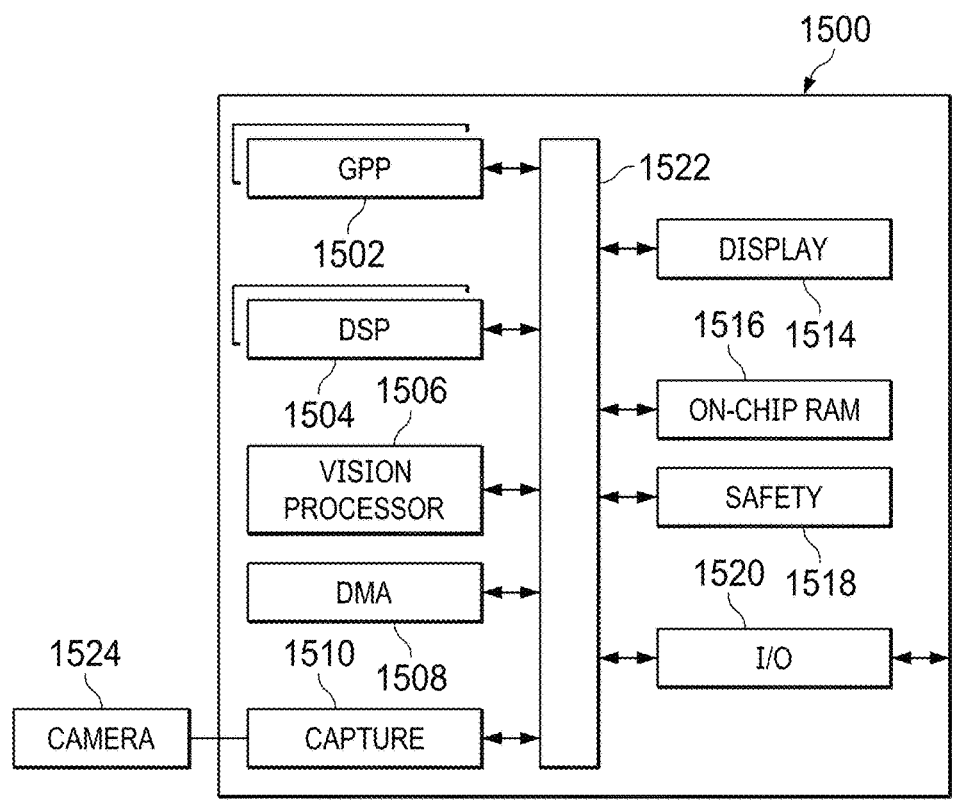
FIG. 15 is a high level block diagram of an example multiprocessor system-on-a-chip (SOC) that may execute a CNN.

FIG. 15 is a high level block diagram of an example multiprocessor system-on-a-chip (SOC) 1500 configured for use in an embedded camera based ADAS. In particular, the example SOC 1500 is an embodiment of the TDA3X SOC available from Texas Instruments, Inc. A high level description of the components of the SOC 1500 is provided herein. More detailed descriptions of example components may be found in M. Mody, et al., "High Performance Front Camera ADAS Applications on TI's TDA3X Platform," Proceedings of 2015 IEEE $22^{nd}$ International Conference on High Performance Computing, Dec. 16-19, 2015, Bangalore, India, pp. 456-463, and "TDA3x SOC Processors for Advanced Driver Assist Systems (ADAS) Technical Brief," Texas Instruments, SPRT704A, October, 2014, pp. 1-6, which are incorporated by reference herein.

The SOC 1500 includes dual general purpose processors (GPP) 1502, dual digital signal processors (DSP) 1504, and a vision processor 1506 coupled via a high speed interconnect 1522. The SOC 1500 further includes a direct memory access (DMA) controller 1508, a camera capture component 1510 coupled to a monocular camera 1524, a display management component 1514, on-chip random access (RAM) memory 1516, e.g., a computer readable medium, and various input/output (I/O) peripherals 1520 all coupled to the processors via the interconnect 1522. In addition, the SOC 1500 includes a safety component 1518 that includes safety related functionality to enable compliance with automotive safety requirements. Such functionality may include support for CRC (cyclic redundancy check) of data, clock comparator for drift detection, error signaling, windowed watch-dog timer, and self testing of the SOC for damage and failures. Software implementing a CNN with a BMA-based convolution kernel as described herein in which the CNN is trained to process frames captured by the camera 1524 may be stored in the memory 1516 (e.g., a computer readable medium) and may execute on one or more programmable processors of the SOC 1500, e.g., the DSPs 1504. In some embodiments, the CNN may be a sparsified CNN generated using sparsified fine tuning as described herein.

Figure 16:
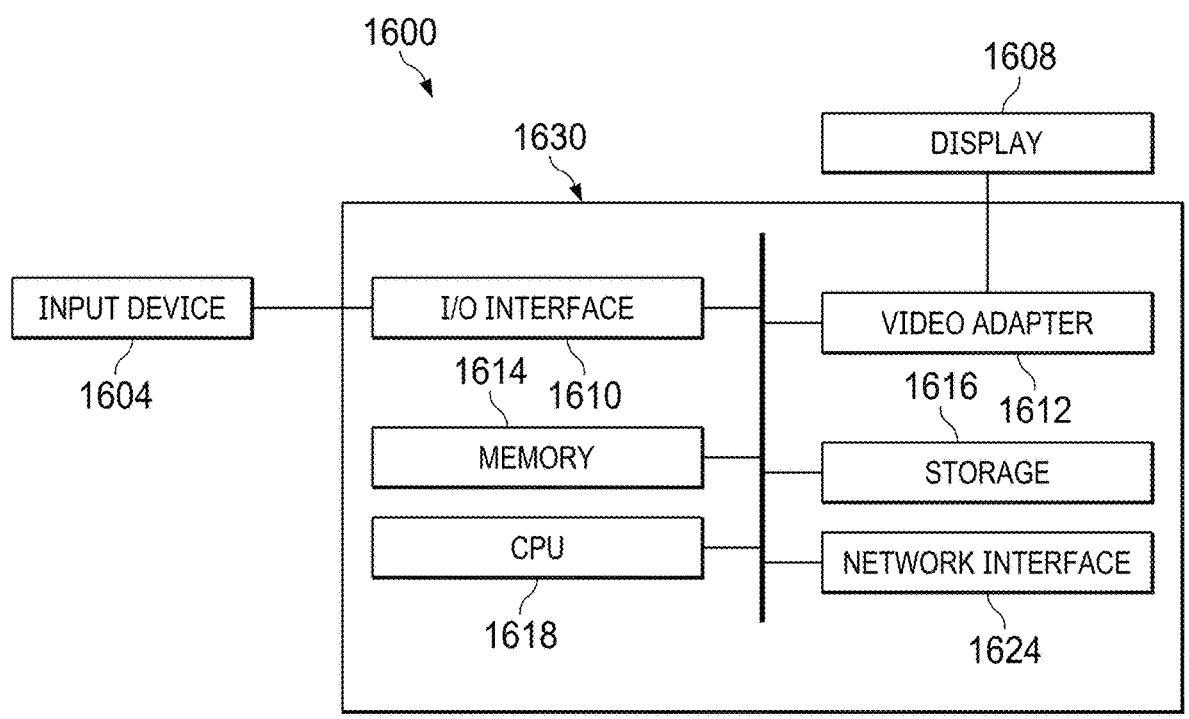
FIG. 16 is a simplified block diagram of a computer system that may be used to train a sparsified CNN.

FIG. 16 is a simplified block diagram of a computer system 1600 that may be used to train a sparsified CNN. The computer system 1600 includes a processing unit 1630 equipped with one or more input devices 1604 (e.g., a mouse, a keyboard, or the like), and one or more output devices, such as a display 1608, or the like. In some embodiments, the display 1608 may be touch screen, thus allowing the display 1608 to also function as an input device. The display may be any suitable visual display unit such as, for example, a computer monitor, an LED, LCD, or plasma display, a television, a high definition television, or a combination thereof.

The processing unit 1630 includes a central processing unit (CPU) 1618, memory 1614, a storage device 1616, a video adapter 1612, an I/O interface 1610, a video decoder 1622, and a network interface 1624 connected to a bus. The bus may be one or more of any type of several bus architectures including a memory bus or memory controller, a peripheral bus, video bus, or the like.

The CPU 1618 may be any suitable type and suitable combination of electronic data processors. For example, the CPU 1618 may include one or more processors from Intel Corp. or Advanced Micro Devices, Inc., one or more Reduced Instruction Set Computers (RISC), one or more Application-Specific Integrated Circuits (ASIC), one or more digital signal processors (DSP), or the like. The memory 1614 may be any type of system memory such as static random access memory (SRAM), dynamic random access memory (DRAM), synchronous DRAM (SDRAM), read-only memory (ROM), flash memory, a combination thereof, or the like. Further, the memory 1614 may include ROM for use at boot-up, and DRAM for data storage for use while executing programs.

The storage device 1616 (e.g., a computer readable medium) may include any type of storage device configured to store data, programs, and other information and to make the data, programs, and other information accessible via the bus. The storage device 1616 may be, for example, one or more of a hard disk drive, a magnetic disk drive, an optical disk drive, or the like. Software instructions implementing training of a CNN with sparsified fine tuning as described herein may be stored on the storage device 1616. Training images may also be stored device 1616 or may be accessed via the network interface 1624. The software instructions may be initially stored in a computer-readable medium such as a compact disc (CD), a diskette, a tape, a file, memory, or any other computer readable storage device and loaded and executed by the CPU 1618. In some cases, the software instructions may also be sold in a computer program product, which includes the computer-readable medium and packaging materials for the computer-readable medium. In some cases, the software instructions may be distributed to the computer system 1600 via removable computer readable media (e.g., floppy disk, optical disk, flash memory, USB key), via a transmission path from computer readable media on another computer system (e.g., a server), etc.

The video adapter 1612 and the I/O interface 1610 provide interfaces to couple external input and output devices to the processing unit 1630. As illustrated in FIG. 16, examples of input and output devices include the display 1608 coupled to the video adapter 1612 and the mouse/keyboard 1604 coupled to the I/O interface 1610.

The network interface 1624 allows the processing unit 1630 to communicate with remote units via a network. The network interface 1624 may provide an interface for a wired link, such as an Ethernet cable or the like, and/or a wireless link via, for example, a local area network (LAN), a wide area network (WAN) such as the Internet, a cellular network, any other similar type of network and/or any combination thereof.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein in which sparsity thresholding is performed on all coefficients of a convolution layer. One of ordinary skill in the art will understand embodiments in which the sparsity thresholding is performed for subsets of coefficients of a layer, i.e., tensors of a layer. For example, each output feature map of a layer is created by a set of filter coefficients. Sparsity thresholding may be performed on the set of coefficients for each output feature map of a layer rather than on the coefficients for the entire layer.

In another example, embodiments of BMA have been described herein in which the block multiply is skipped when a coefficient value is zero. One of ordinary skill in the art will understand embodiments in which a threshold value that is close to zero is used to decide if the block multiply is to be skipped.

In another example, embodiments of BMA have been described herein that do not include a stride option. One of ordinary skill in the art will understand embodiments that include stride. For example, a convolution layer with a stride of 2 can be split into four BMA operations, the outputs of which are added together to form the output feature map.

In another example, embodiments of BMA have been described herein that do not include a dilation option for a convolution layer. One of ordinary skill in the art will understand embodiments that include dilation for a convolution layer.

In another example, a BMA-based convolution operation may be performed as a series of BMA operations where each BMA operation corresponds to a respective one of a plurality of weight values, and each BMA operation multiplies each of the values in all or a subset of an input feature map/image/data block by the respective weight value and accumulates the product of the multiplication with a corresponding value of a previous feature map to generate a respective output value. The output values generated for each of the values in the input feature map may form the output feature map for the BMA operation. In some examples, the BMA-based convolution operation may perform a first BMA operation with respect to a single, first weight value prior to performing a second BMA operation with respect to a second weight value. In other words, the BMA-based convolution may perform all multiply and accumulate operations for each of the values in all or a subset of an input feature map/image/data block with respect to a single weight value prior to performing any multiplications and/or accumulates with respect to another weight value for any of the values in the same subset of the input feature map/image/data block.

In another example, embodiments have been described herein in which the CNN and BMA-based convolution kernel may be implemented as software instructions executed on processors in a multiprocessor SOC. One of ordinary skill in the art will understand that the CNN and BMA-based convolution kernel may be implemented as any suitable combination of software, firmware, and/or hardware. For example, some of the functionality may be implemented in one or more hardware accelerators, application specific integrated circuits (ASICs), field-programmable gate arrays (FPGAs), etc.

In another example, embodiments have been described herein in reference to image classification in automotive safety systems. One of ordinary skill in the art will understand embodiments for other classification applications, such as, for example, industrial applications, robotics, and medical applications. Further, one of ordinary skill in the art will understand embodiments for non-image based classification, such as, for example, speech or audio or text classification. In addition, one of ordinary skill in the art will understand embodiments for other applications of CNNs.

Software instructions implementing all or portions of methods described herein may be initially stored in a computer-readable medium and loaded and executed by one or more processors. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in systems may be referred to by different names and/or may be combined in ways not shown herein without departing from the described functionality. This document does not intend to distinguish between components that differ in name but not function. In the description and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A method comprising:
performing, using an electronic device, a training of a convolutional neural network (CNN) to generate coefficients associated with a layer of the CNN;
tuning, using the electronic device, the layer of the CNN by at least:
selecting some of the coefficients based on a sparsity target representative of a ratio of a number of zero coefficients to a total number of the coefficients of the layer; and
setting the selected coefficients to zero; and
for each respective nonzero coefficient of the coefficients, performing, using the electronic device, a block multiply accumulation (BMA) operation, wherein the BMA operation multiplies the respective nonzero coefficient with an input data block corresponding to the respective nonzero coefficient.

2. The method of claim 1, wherein:
the training is based on a stochastic gradient descent back propagation.

3. The method of claim 1, wherein:
the training includes a weight decay configured to induce sparsity in the selected coefficients.

4. The method of claim 1, wherein:
the BMA operation accumulates a result in an output data block corresponding to the respective nonzero coefficient.

5. The method of claim 1, further comprising:
determining a sparse coefficient map for the layer of the CNN, wherein the sparse coefficient map identifies the selected coefficients that are set to zero.

6. The method of claim 1, further comprising determining a threshold for the layer of the CNN based on the sparsity target and a maximum threshold value, wherein setting some of the coefficients is based on the threshold.

7. The method of claim 6, wherein:
the maximum threshold value is based on a maximum coefficient value; and
the maximum coefficient value is a highest absolute value of the coefficients for the layer of the CNN.

8. The method of claim 6, wherein:
the sparsity target is based on a number of layers of the CNN.

9. The method of claim 1, wherein the electronic device includes an embedded device.

10. The method of claim 1, wherein the electronic device is associated with an image processing system of an automobile.

11. An apparatus comprising:
a memory storing software instructions; and
one or more processors coupled to the memory, the one or more processors being operable when executing the software instructions to:
train a convolutional neural network (CNN) to generate coefficients associated with a layer of the CNN;
tune the layer of the CNN by at least:
selecting some of the coefficients based on a sparsity target representative of a ratio of a number of zero coefficients to a total number of the coefficients of the layer; and
setting the selected coefficients to zero; and
for each respective nonzero coefficient of the coefficients, perform a block multiply accumulation (BMA) operation, wherein the BMA operation multiplies the respective nonzero coefficient with an input data block corresponding to the respective nonzero coefficient.

12. The apparatus of claim 11, wherein:
the software instructions to train include training based on a stochastic gradient descent back propagation.

13. The apparatus of claim 11, wherein:
the software instructions to train include a weight decay configured to induce sparsity in the selected coefficients.

14. The apparatus of claim 11, wherein:
the BMA operation accumulates a result in an output data block corresponding to the respective nonzero coefficient.

15. The apparatus of claim 11, further comprising:
software instructions to determine a sparse coefficient map for the layer of the CNN, wherein the sparse coefficient map identifies the selected coefficients that are set to zero.

16. The apparatus of claim 11 wherein:
the selected coefficients are selected based on a threshold for the layer of the CNN, and wherein the threshold is based on the sparsity target and a maximum threshold value.

17. The apparatus of claim 16, wherein:
the maximum threshold value is based on a maximum coefficient value; and
the maximum coefficient value is a highest absolute value of the coefficients for the layer of the CNN.

18. The apparatus of claim 16, wherein:
the sparsity target is based on a number of layers of the CNN.

19. The apparatus of claim 11, wherein the apparatus includes an embedded device.

20. The apparatus of claim 11, wherein the apparatus is associated with an image processing system of an automobile.

* * * * *